(12) United States Patent
Santoni

(10) Patent No.: US 6,594,392 B2
(45) Date of Patent: *Jul. 15, 2003

(54) PATTERN RECOGNITION BASED ON PIECEWISE LINEAR PROBABILITY DENSITY FUNCTION

(75) Inventor: Umberto Santoni, Chandler, AZ (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/312,920

(22) Filed: May 17, 1999

(65) Prior Publication Data

US 2002/0039446 A1 Apr. 4, 2002

(51) Int. Cl.[7] .................................................. G06K 9/62
(52) U.S. Cl. .......................... 382/209; 382/119; 382/160; 382/190; 382/215; 382/228; 704/239; 704/240; 704/241; 704/256
(58) Field of Search ................................. 382/156–157, 382/165, 181, 190, 199, 203, 206, 209, 218, 215–221, 224–225, 228, 297; 704/238, 239, 240–241, 243, 246, 248, 253, 255–256, 259; 706/25

(56) References Cited

U.S. PATENT DOCUMENTS

| | | | | |
|---|---|---|---|---|
| 4,608,708 A | * | 8/1986 | Watanabe | 704/238 |
| 4,727,504 A | * | 2/1988 | Van Broekhoven | 708/300 |
| 5,097,509 A | * | 3/1992 | Lennig | 704/240 |
| 5,129,002 A | * | 7/1992 | Tsuboka | 704/246 |
| 5,459,668 A | * | 10/1995 | Dogan et al. | 701/223 |
| 5,459,798 A | * | 10/1995 | Bailey et al. | 382/218 |
| 5,479,576 A | * | 12/1995 | Watanabe et al. | 706/25 |
| 5,710,866 A | * | 1/1998 | Alleva et al. | 704/256 |
| 5,737,488 A | * | 4/1998 | Iso | 704/256 |
| 5,822,729 A | * | 10/1998 | Glass | 704/255 |
| 5,857,169 A | * | 1/1999 | Seide | 704/256 |
| 5,912,989 A | * | 6/1999 | Watanabe | 382/228 |
| 5,991,442 A | * | 11/1999 | Yamada et al. | 382/218 |
| 6,067,369 A | * | 5/2000 | Kamei | 382/125 |
| 6,078,884 A | * | 6/2000 | Downey | 704/243 |
| 6,137,909 A | * | 10/2000 | Greineder et al. | 382/190 |
| 6,226,409 B1 | * | 5/2001 | Cham et al. | 382/228 |
| 6,449,612 B1 | * | 9/2002 | Bradley et al. | 707/6 |

* cited by examiner

Primary Examiner—Bhavesh M. Mehta
Assistant Examiner—Gregory Desire
(74) Attorney, Agent, or Firm—Blakely, Sokoloff, Taylor & Zafman LLP

(57) ABSTRACT

The present invention is a method and apparatus to determine a similarity measure between first and second patterns. First and second storages store first and second feature vectors which represent the first and second patterns, respectively. A similarity estimator is coupled to the first and second storages to compute a similarity probability of the first and second feature vectors using a piecewise linear probability density function (PDF). The similarity probability corresponds to the similarity measure.

18 Claims, 7 Drawing Sheets

PATTERN RECOGNITION BASED ON PIECEWISE LINEAR PROBABILITY DENSITY FUNCTION

BACKGROUND

1. Field of the Invention

This invention relates to computer architecture. In particular, the invention relates to processor-based pattern recognition.

2. Description of Related Art

Recognizing an unknown pattern such as speech or handwriting can be accomplished by determining how closely the features of the unknown pattern match to the features of a known, ideal pattern. The features of both the known and unknown patterns can be represented by a multi-dimensional vector in a feature space, with one feature for each dimension.

The comparison, or matching, of the feature vectors between the unknown pattern and the known pattern(s) is inherently a time-consuming process. When the dimensionality of the feature space becomes large, the computations become prohibitively high. In many applications where real-time processing is desired, it is preferable to perform these computations as fast as possible.

In addition, the comparison or matching process typically follow rigid and fixed calculations. Contextual information in forms of weighting factors or probability density function are not fully exploited. The result is that the classification is not robust and flexible, resulting in high classification errors.

Therefore there is a need in the technology to provide a robust and flexible method to perform pattern recognition at a high processing rate.

SUMMARY

The present invention is a method and apparatus to determine a similarity measure between first and second patterns. First and second storages store first and second feature vectors which represent the first and second patterns, respectively. A similarity estimator is coupled to the first and second storages to compute a similarity probability of the first and second feature vectors using a piecewise linear probability density function (PDF). The similarity probability corresponds to the similarity measure.

BRIEF DESCRIPTION OF THE DRAWINGS

The features and advantages of the present invention will become apparent from the following detailed description of the present invention in which.

DESCRIPTION

A method and apparatus are described to match two patterns based on a similarity measure between the two patterns. The similarity measure is computed using a piecewise linear probability density function (PDF). A total probability measure corresponding to the similarity measure is computed based on the difference between the feature vectors of the two. The technique is suitable for parallel processing for multiple feature elements. The technique provides a fast classification of patterns.

Figure 1A:
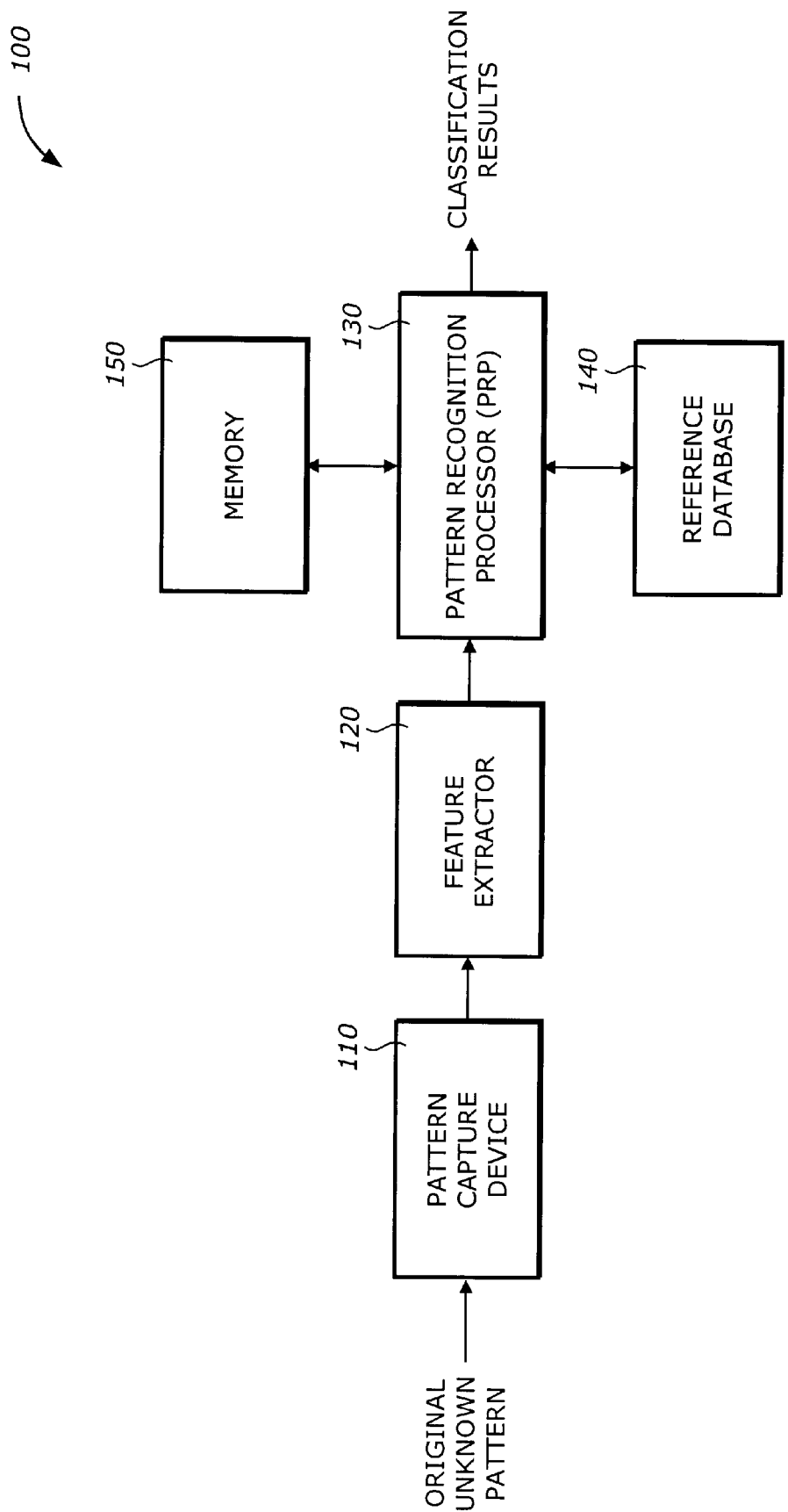
FIG. 1A is a diagram illustrating a system in which one embodiment of the invention can be practiced.

FIG. 1A is a diagram illustrating a system 100 in which one embodiment of the invention can be practiced. The system 100 includes a pattern capture device 110, a feature extractor 120, a pattern recognition processor 130, a reference database 140, and a memory 150. The system 100 classifies an unknown pattern into known classes.

The pattern capture device 110 receives the original unknown pattern to be classified or recognized. The original unknown pattern may be any appropriate pattern. Some examples are speech waveforms, handwriting samples, fingerprint samples, etc. The pattern capture device 110 may be an image capture device (e.g., camera with video digitizer), a speaker, a tablet digitizer, or a scanner, which acquires the unknown pattern and converts into digital form. The feature extractor 120 extracts the relevant features from the captured unknown pattern. Usually, the types of relevant features are determined in advance and are the same as the features in the reference database 140. The feature extractor 120 may be implemented by software or hardware depending on system requirements. The feature extractor 120 essentially reduces the matching or classification space into a more manageable size. In addition, the feature extractor 120 retains only relevant features for classification to reduce errors due to noises in the original pattern.

The particular implementation of the feature extractor 120 depends on the type of patterns to be recognized. For example, in handwriting recognition, the relevant features may include the types of strokes, the curvature, the number of strokes. The feature extractor 120 generates a feature vector which contains the values of the feature elements. This feature vector is used to compare with the feature vector of patterns of known classes stored in the reference database 140.

The pattern recognition processor (PRP) 130 is a processor that performs the classification of the unknown pattern and generate classification results. The PRP 130 contains a hardware architecture to carry out the computations of the classification. The PRP 130 is described more fully later.

The reference database 140 is a storage that stores all the feature elements of all the patterns of known classes that are used during the classification process. The reference database 140 may be implemented by a mass storage device, an external memory, or a local fast memory. The feature elements stored in the reference database 140 are usually computed in advance based on a set of training data or samples. The set of training data are obtained from patterns of known classes. Depending on the particular method of classification, all feature vectors of all patterns of known classes (referred to as known patterns) are used, or one feature vector per class will be used.

The memory 150 stores the program code and data that are used by the PRP 130 for the classification process. The memory 150 may also be used to store probability coefficients and feature vectors of the unknown and known elements as described later. The memory 150 is typically a random access memory (RAM, dynamic or static), read only memory (ROM), or flash memory.

Figure 1B:
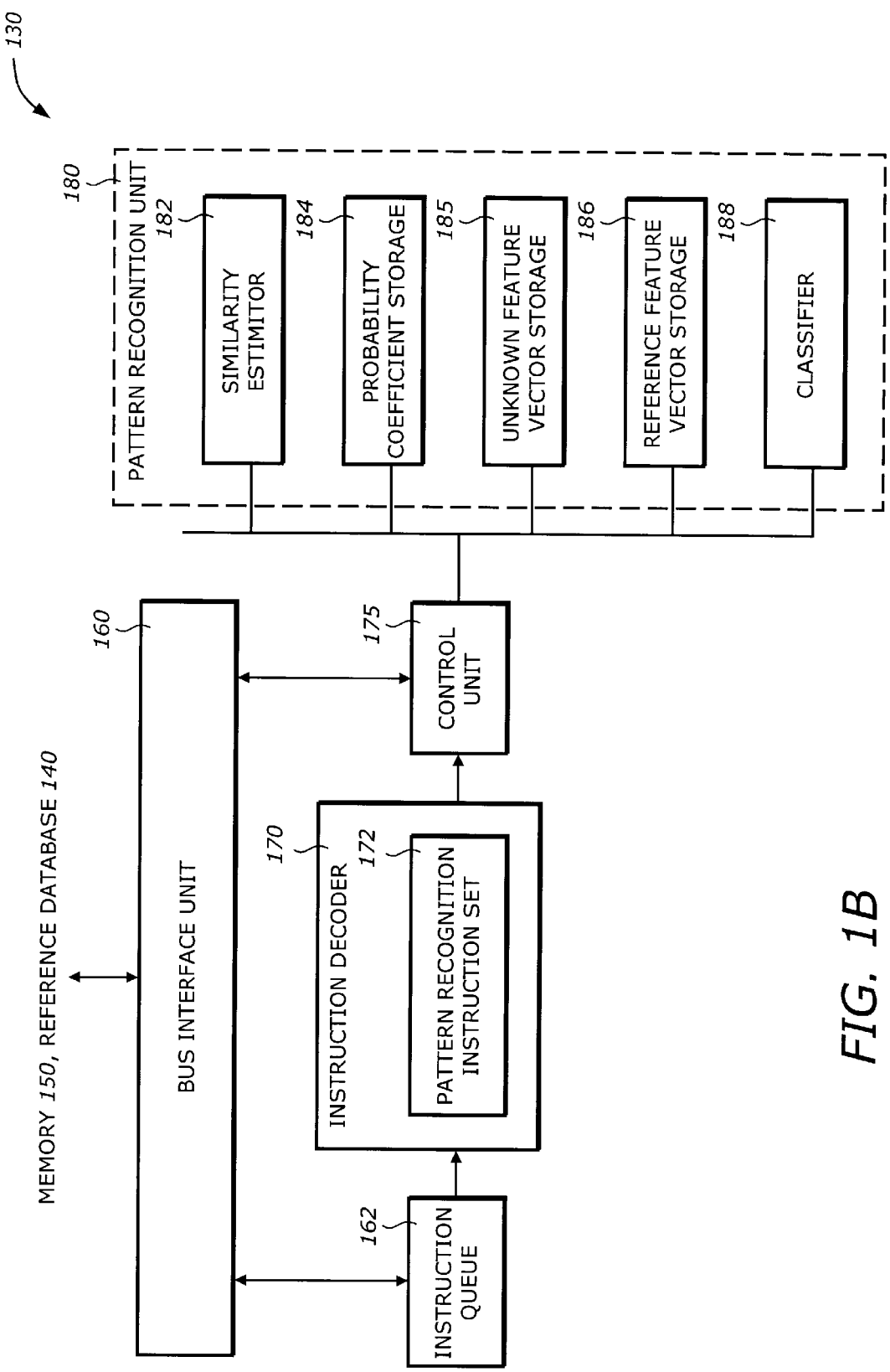
FIG. 1B is a diagram illustrating a pattern recognition processor according to one embodiment of the invention.

FIG. 1B is a diagram illustrating a pattern recognition processor (PRP) 130 according to one embodiment of the invention. The PRP 130 may be a special processor designed for pattern recognition or classification or a general purpose processor with enhanced capabilities for pattern recognition tasks. The PRP 130 includes a bus interface unit 160, an instruction queue 162, an instruction decoder 170, a control unit 175, and a pattern recognition unit 180.

The bus interface unit 160 provides interface to the external devices such as the memory 150 and the reference database 160 shown in FIG. 1A. The instruction queue 162 receives instruction words in the memory 150 fetched by the bus interface unit 160. The instruction queue 162 provides streams of instructions to the instruction decoder 170. The instruction decoder 170 decodes the instructions forwarded by the instruction queue 162. The instruction decoder 170 may be implemented by a pipelined architecture to accelerate the instruction decoding process. The instruction decoder 170 has decoding circuitry to decode a pattern recognition instruction set (PRIS) 172. The instruction decoder 170 may also be configured to decode other instructions such as arithmetic, logical, load, store, and control instructions. The PRIS 172 includes a number of instructions specifically tailored for pattern recognition. These instructions use the pattern recognition unit 180. The control unit 175 receives the decoded instruction from the instruction decoder 170 and generates control signals to the pattern recognition unit 180 and the bus interface unit 160.

The pattern recognition unit 180 is the core of the PRP 130 that performs pattern recognition operations. The pattern recognition unit 180 includes a similarity estimator 182, a probability coefficient storage 184, an unknown feature vector storage 185, a reference feature vector storage 186, and a classifier 188.

The similarity estimator 182 computes a similarity measure between the unknown feature vector from the unknown feature vector storage 185 and a known feature vector from the reference feature vector storage 186. The probability coefficient storage 184 stores the coefficients for the determination of the probability density function (PDF) for each feature dimension. These coefficients are usually determined in advance and stored or downloaded into the probability coefficient storage 184. The probability coefficient storage 184 may be implemented by a register file or a fast local memory (e.g., random access memory, cache, flash memory). The unknown and reference feature vector storages 185 and 186 store the feature elements of the unknown pattern and patterns of known classes, respectively. The values of these feature elements are obtained from the reference database 140. The unknown and reference feature vector storages 185 and 186 may be implemented by a set of register files or fast local memory.

The classifier 188 receives the result of the similarity estimator 182 and generates the classification results. In a multi-class pattern recognition problem, the classifier 188 typically determines the class of the unknown pattern by comparing the similarity measures between the unknown pattern and the patterns of known classes stored in the reference feature vector space 186. Typically, the class of the unknown pattern is the class of the reference pattern that provides the minimum similarity measure i.e., that best matches the unknown pattern.

Figure 2:
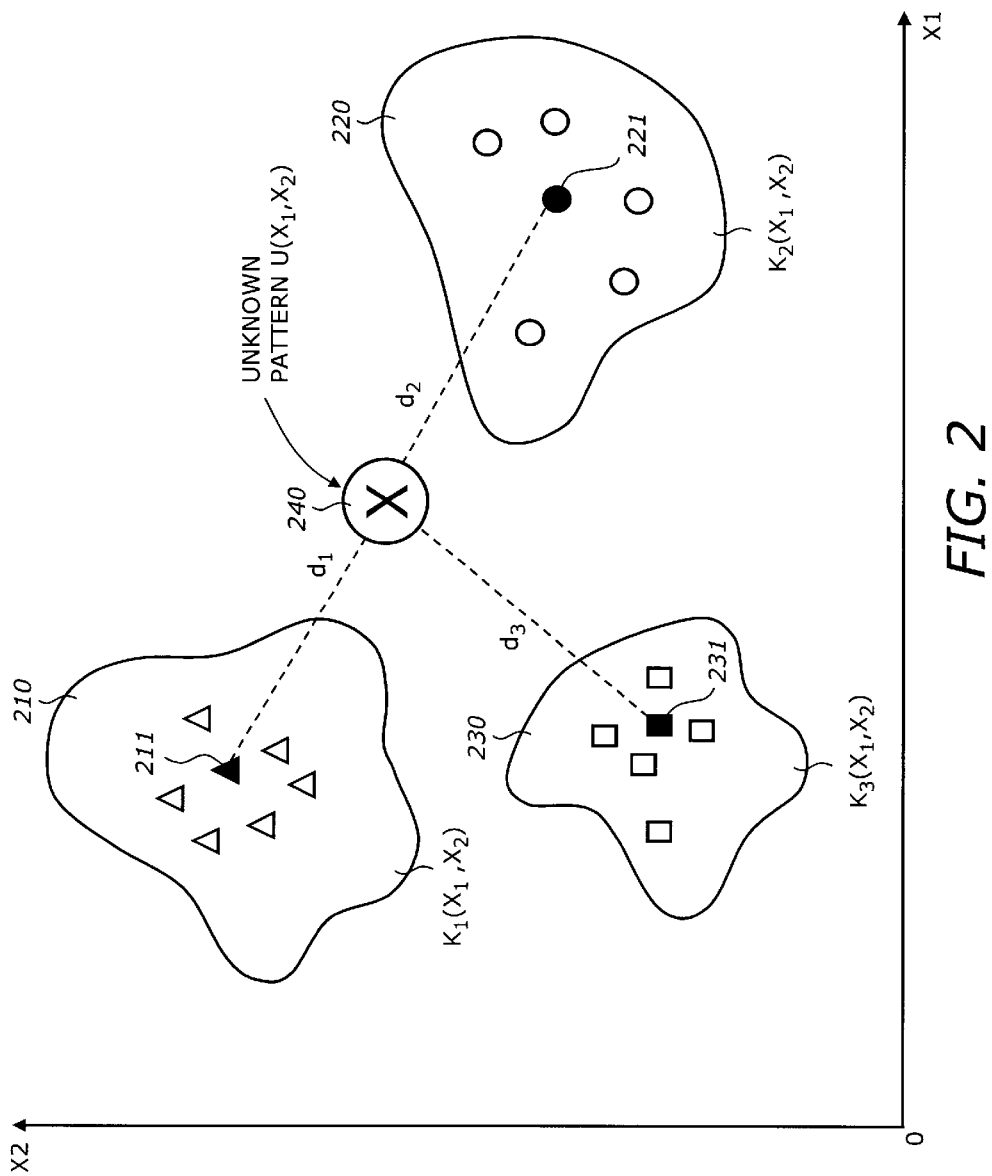
FIG. 2 is a diagram illustrating a classification of an unknown pattern in a feature space according to one embodiment of the invention.

FIG. 2 is a diagram illustrating a classification of an unknown pattern in a feature space according to one embodiment of the invention. In the illustrative example shown in FIG. 2, there are two feature dimensions, $x_1$ and $x_2$, and three clusters 210, 220, and 230, and an unknown pattern 240.

In this illustrative example, the three classes $K_1$, $K_2$, and $K_3$ form three clusters 210, 220, and 230, respectively. Each of the clusters 210, 220, and 230 contain a group of training samples. Each of the training samples is represented by a two-dimensional feature vector $K_{jk}(x_1, x_2)$ where j is the index of the class number and k is the index of the sample in class j.

The unknown pattern 240 is also represented by a two-dimensional feature vector $U(x_1, x_2)$. The unknown pattern 240 is classified to one of the three classes $K_1$, $K_2$, and $K_3$ based on the similarity between its feature vector and the feature vectors of the classes $K_1$, $K_2$, and $K_3$. This can be done by computing the distance between the unknown pattern 240 to the corresponding samples on the feature space $(x_1, x_2)$.

There are several techniques to classify the unknown pattern 240. These techniques are well known in the art. Examples of these techniques are K nearest neighbor (KNN), weighted KNN, minimum distance classifier (MDC). In all these techniques, the common operation is to determine the similarity between the unknown feature vector with a known feature vector. This similarity measure is represented by the distance in the feature space between the unknown sample point and the known sample point. The unknown pattern is then classified according to the similarity measure.

For example, in the MDC technique, each known class is represented by a representative sample. The distances between the unknown sample point are computed to all these representative sample points. The unknown pattern is then classified to the class whose distance between its representative sample point and the unknown sample point is minimum. In the illustrative example shown in FIG. 2, the clusters 210, 220, and 230 contain a number of training samples. Suppose the representative sample is determined as the average of all the training samples in the cluster. Classes $K_1$, $K_2$, and $K_3$ in clusters 210, 220, and 230 have the representative sample points 211, 221, and 231 respectively. The distances between the unknown sample point 240 and the representative sample points 211, 221, and 231 are computed as $d_1$, $d_2$, and $d_3$, respectively. In this example, $d_1$ is the minimum, so the unknown pattern 240 is classified as class $K_1$.

The computation of the similarity measure, or distance, between an unknown feature vector and a known feature vector is a time-consuming process. When the number of features, or the dimensionality of the feature space, becomes large, this computation becomes a bottleneck in the classification. The present invention provides a technique to accelerate the computation of the similarity measure to classify unknown patterns efficiently.

Figure 3:
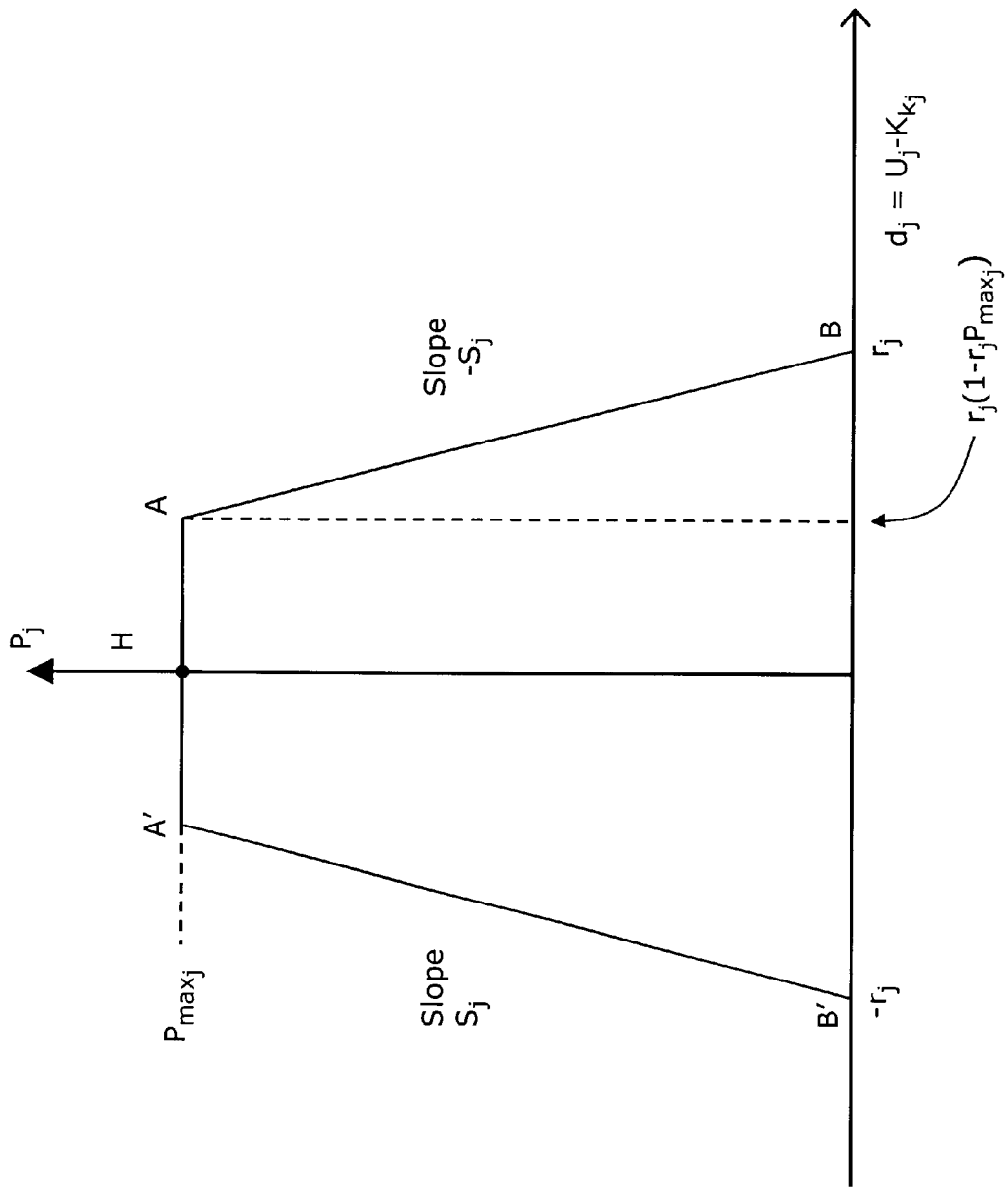
FIG. 3 is a diagram illustrating a piecewise linear probability density function according to one embodiment of the invention.

FIG. 3 is a diagram illustrating a piecewise linear probability density function according to one embodiment of the invention. The PDF is represented in a two-dimensional coordinate system. Each feature dimension j is represented by a corresponding PDF. The PDF curve has two axes: the vertical axis $P_j$ represents the value of the probability that the unknown feature element j matches the known feature element j, the horizontal axis represents the difference $d_j$ between the unknown feature element j and the known feature element j.

The piecewise linear PDF includes two linear segments: the segment HA and the segment AB. The PDF is symmetrical about the vertical axis. The segments HA' and A'B' are the mirror versions the HA and AB about the $P_j$ axis. For simplicity, it is preferable to compute the difference $d_j$ as an absolute value and examine the PDF on the positive half.

Let $U_j$ and $K_{kj}$ be the feature element j, corresponding to feature dimension j in the feature space, of the unknown feature vector U and the known feature vector of class k $K_k$. Then the difference $d_j$ is computed as:

$$d_j = U_j - K_{kj} \quad (1)$$

The similarity probability $P_j$ of the feature dimension j is the likelihood that $U_j$ matches $K_{kj}$. The similarity probability $P_j$ represents the matching score between the two corresponding feature elements. $P_j$ is a function of $d_j$ and is determined as follows:

$$P_j = c_j*(1-c_j*d_j) = c_j - s_j*d_j \text{ for } d_m \leq d_j \leq r_j \quad (2a)$$

$$P_j = P_{max} \text{ for } 0 < d_j < d_m \quad (2b)$$

$$P_j = 0 \text{ for } d_j > r_j \quad (2c)$$

where:

$c_j = \text{sqrt}(s_j) = 1/r_j$ is one PDF coefficient for dimension j. This condition is necessary to yield a probability density.

$s_j$ is the magnitude of the slope of the segment AB.

$r_j$ is the range of the function, being the maximum difference allowed between two features of two vectors.

$d_m$ is the saturating difference. In other words, $P_j$ is limited to $P_{max,j}$ when $d_j$ is less then $d_m$. The expression for $d_m$ is:

$$d_m = r_j*(1 - r_j*P_{max,j}) \quad (3)$$

$P_{max,j}$ is the maximum value of the similarity probability for the dimension j.

Let N be the total number of feature elements, or the dimensionality of the feature space. The total similarity probability $P_{ktotal}$ for membership in class K is computed as:

$$P_{ktotal} = \Sigma \beta_j * P_j \; j=1, \ldots, N \quad (4)$$

where $\beta_j$'s are the feature weights.

The $P_{ktotal}$ is a linear combination of the individual probabilities $P_j$'s. If all features are weighted equally, then all $\beta_j$'s are the same and are equal to (1/N), and the total probability $P_{ktotal}$ is reduced to the arithmetic mean of all the probabilities $P_j$'s. The feature weighting can also be carried out by adjusting the coefficients $c_j$'s of the individual similarity probabilities $P_j$'s. The total probability $P_{ktotal}$ corresponds to the similarity measure between the unknown and reference patterns.

Figure 4:
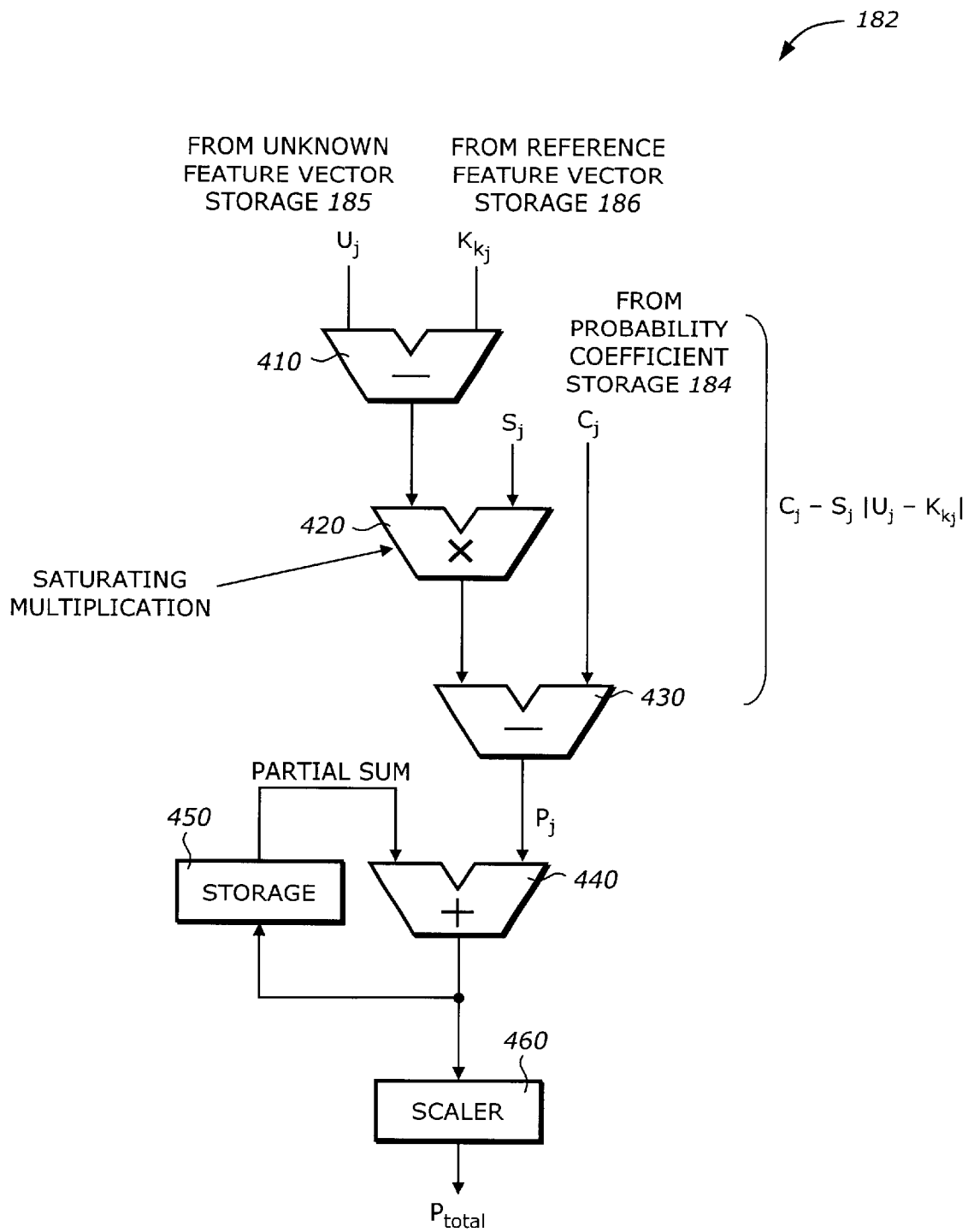
FIG. 4 is a diagram illustrating a similarity probability estimator according to one embodiment of the invention.

FIG. 4 is a diagram illustrating a similarity estimator 182 according to one embodiment of the invention. The similarity probability estimator 182 includes subtractors 410 and 430, a multiplier 420, an adder 440, a storage 450, and a scaler 460. The similarity probability estimator 182 essentially computes the total probability $P_{ktotal}$ as shown in equation (4).

The subtractor 410 receives the feature elements $U_j$ and $K_{kj}$ from the unknown and reference feature vector storage 185 and 186, respectively. The subtractor 410 computes the absolute difference between $U_j$ and $K_{kj}$, or $|d_j|$. The multiplier 420 multiplies $|d_j|$ with the slope coefficient $s_j$ from the probability coefficient storage 124. The multiplier 420 has a saturation logic that hard limits the product to a maximum probability $P_{max,j}$. This saturation logic may include a comparator to compare the product with the corresponding $P_{max,j}$ and a data selector to produce the result based on the comparator result. The subtractor 430 computes the similarity probability $P_j$ for the dimension j by subtracting the $s_j*d_j$ from $c_j$ according to equation (2a). The adder 440 adds the individual $P_j$'s to produce the total probability $P_{total}$. The storage 450 accumulates the partial sum in the addition of all the $P_j$'s for all the feature dimensions. The scaler 460 is optional and is used to scale the accumulated sum of $P_j$'s by 1/N to produce the arithmetic mean $P_{total}$.

Since the computations of the feature elements are independent with each other, it is possible to perform the computations of the $P_j$'s in parallel. When the number of features is large, the parallel computations of $P_j$'s speeds up the classification process. The parallel implementation of the similarity probability estimator is best accomplished by a single instruction multiple data (SIMD) architecture.

Figure 5:
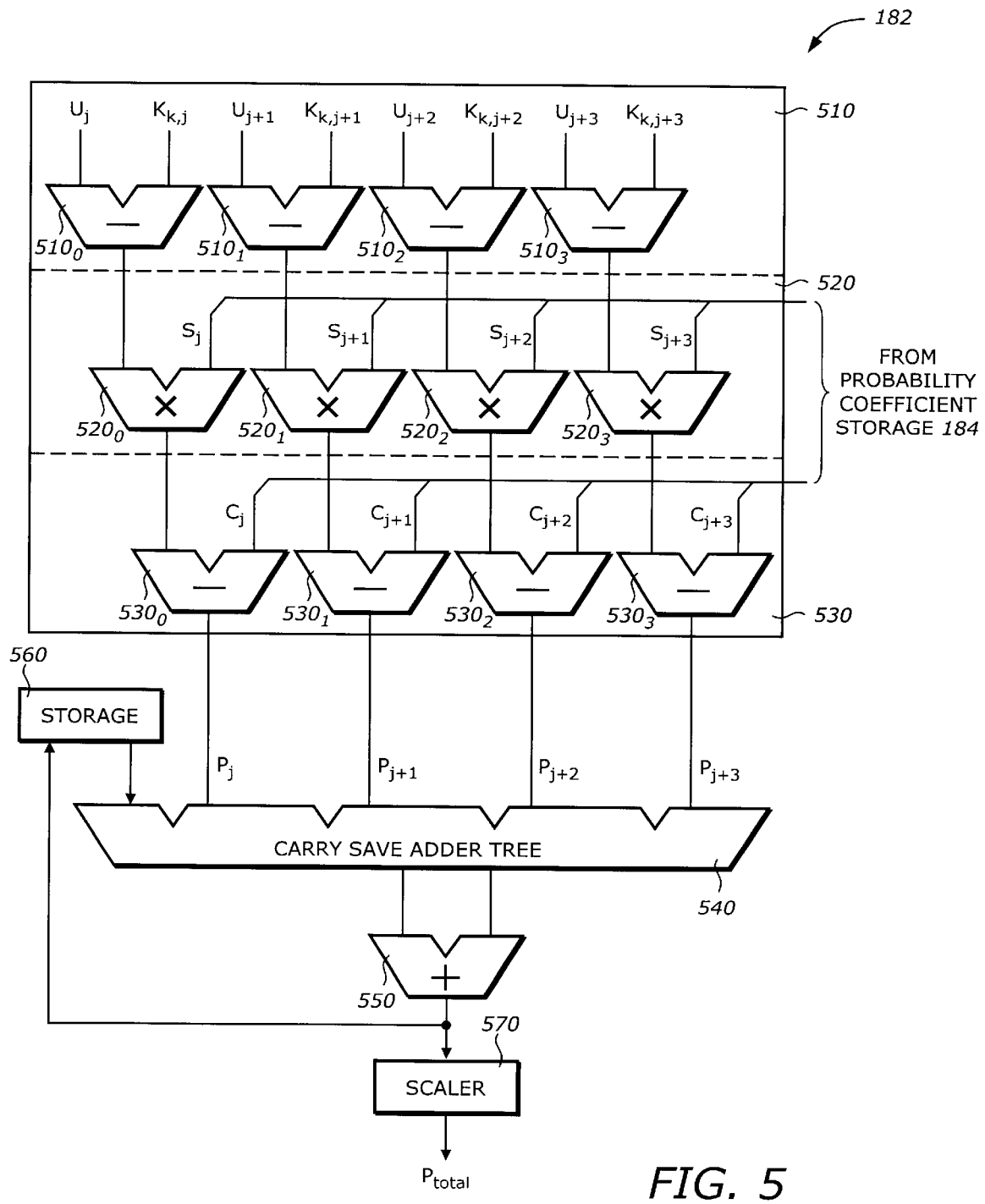
FIG. 5 is a diagram illustrating an SIMD similarity probability estimator according to one embodiment of the invention.

FIG. 5 is a diagram illustrating an SIMD similarity estimator 182 according to one embodiment of the invention. The SIMD similarity estimator 182 includes two SIMD subtractors 510 and 520, an SIMD multiplier 520, a carry save adder (CSA) 540, an adder 550, a storage 560, and a scaler 570. In the illustrative example shown in FIG. 5, each of the SIMD architectures has four parallel elements. As is knowingly one skilled in the art, any number of parallel elements can be used as appropriate.

The SIMD subtractor 510 is a subtractor array which includes four subtractors $510_0$ through $510_3$ performing four subtractors in parallel. Each of the subtractor $510_0$ through $510_3$ computes the difference of each feature element of the unknown and known patterns $U_j$ and $K_{kj}$. Four subtractors $510_0$ through $510_3$ perform the subtraction in one computational cycle for four feature elements simultaneously.

Similarly, the SIMD multiplier 520 and SIMD subtractor 530 are multiplier and subtractor arrays which include four multipliers $520_0$ through $520_3$ and four subtractors $530_0$ though $530_3$, respectively, performing four multiplications and four subtractions, respectively, in parallel.

The CSA 540 adds four individual probabilities $P_j$ through $P_{j+3}$. If the number of feature dimensions is greater than four, then the SIMD architectures continue to process the next set of feature elements and the CSA 540 adds to the previous partial sum. The CPA 550 adds the sum form the CSA 540 to the previous partial sum stored in the storage 560. Initially, the storage 560 contains all zeros. The use of the CPA 550 and the CSA tree 540 is more area-efficient than using individual CPA's for each SIMD result. Finally, the scaler 570 scales the final total probability $P_{total}$ by (1/N).

The SIMD implementation may have a high area efficiency due to the use of similar elements. For example, the CSA tree in the CSA 540 can be combined with the subtractors 530 and the CSA tree inside the SIMD multiplier 520 into a larger CSA tree, for even greater area efficiency and performance.

Figure 6:
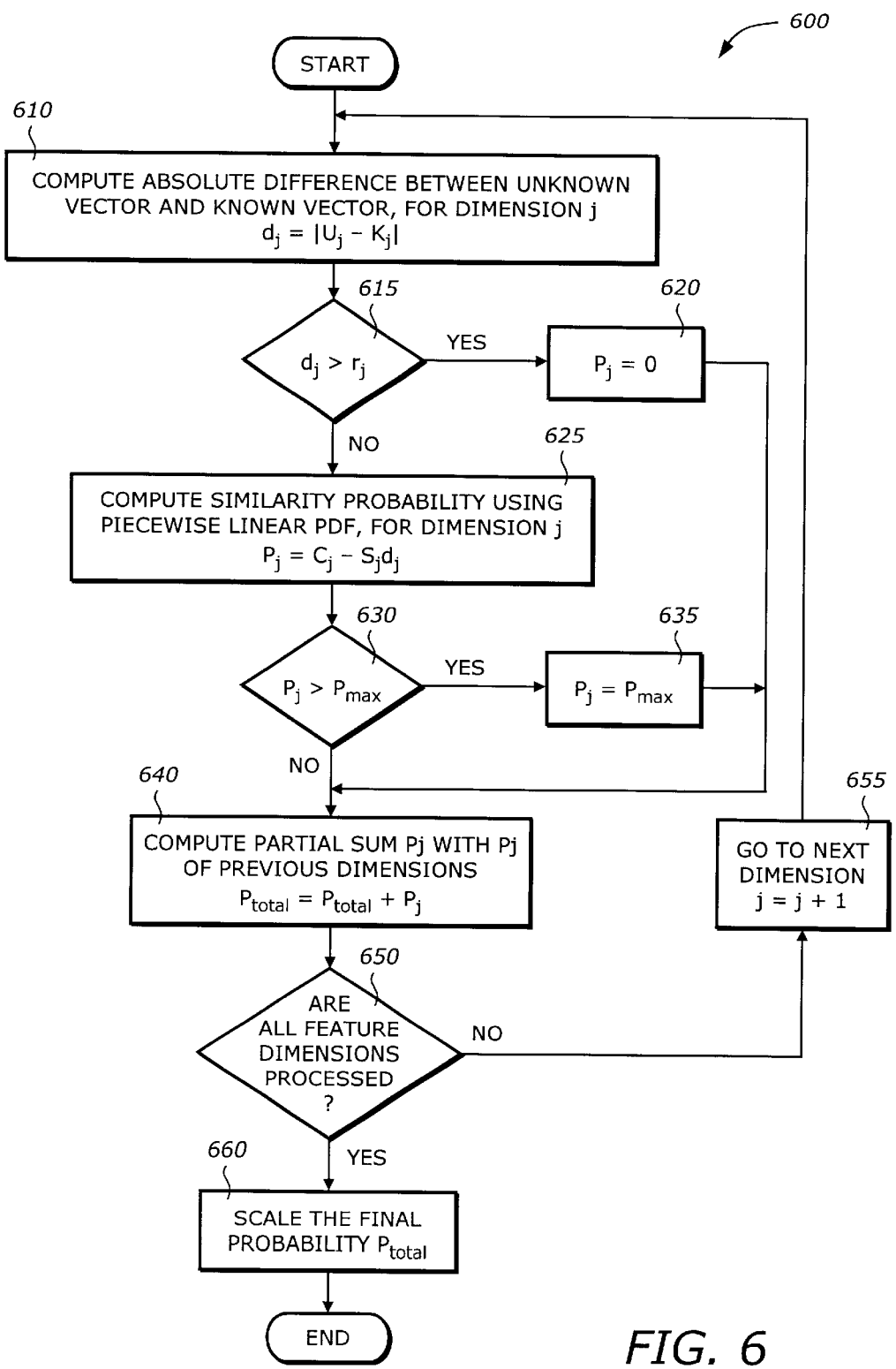
FIG. 6 is a flowchart illustrating a process to determine the similarity probability based on piecewise PDF according to one embodiment of the invention.

FIG. 6 is a flowchart illustrating a process 600 to determine the similarity probability based on a piecewise PDF according to one embodiment of the invention.

Upon START, the process 600 computes the absolute difference $d_j$ between the unknown feature element $U_j$ and the known feature element of class k $K_{kj}$ (Block 610). The process 600 then determines if the resulting $d_j$ is greater than the coefficient $r_j$ (Block 615). If it is, the process 600 returns the value $P_j$ to zero (Block 620) and goes to block 640. Otherwise, the process 600 determines the similarity probability $P_j$ using the piecewise PDF $Pj = c_j - (s_j*d_j)$ (Block 625).

Then the process 600 determines if the resulting $P_j$ is greater than the corresponding maximum value of the similarity probability $P_{max,j}$ (Block 630). If it is, then the process applies a saturation logic to assigns the $P_{max,j}$ to $P_j$ (Block 635) and then goes to block 640. Otherwise, the process 600 computes the partial sum $P_{total}$ by accumulating the Pj (Block 640).

Next, the process 600 determines if all the feature dimensions in the feature space have been processed (Block 650). If not, the process updates the dimension index j to the next dimension (Block 655) and goes back to block 610. If all the feature dimensions have been completed, the process 600 scales the final probability by the scale factor 1/N (Block 660). The process 600 is then terminated.

Thus, the present invention is a technique to classify an unknown pattern using piecewise linear probability density function. The technique is suitable for hardware implementation and parallel SIMD architectures. The technique produces fast and robust classification results.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   (a) obtaining first and second feature vectors representing first and second patterns, respectively; and
   (b) computing a similarity probability of the first and second feature vectors using a symmetrical piecewise linear probability density function (PDF) including a plurality of linear segments, the similarity probability corresponding to a similarity measure between the first and second patterns.

2. The method of claim 1 wherein the first and second feature vectors each have one or more feature elements corresponding to one or more feature dimensions in a feature space of the first and second patterns.

3. The method of claim 2 wherein (b) comprises: (b1) computing a total probability by a linear combination of individual probabilities, the total probability corresponding to the similarity measure.

4. The method of claim 3 wherein (b1) comprises:
   (b11) computing individual probabilities based on the corresponding feature elements of the first and second feature vectors.

5. The method of claim 4 where in (b11) comprises:
   computing a difference between the corresponding feature elements of the first and second feature vectors;
   multiplying the difference with a first probability coefficient to generate a product, the first probability coefficient representing a slope of a linear segment of the piecewise PDF of the corresponding feature element of one of the first and second feature vectors, the product being saturated by a corresponding maximum probability value; and
   subtracting the product from a second probability coefficient to generate the corresponding individual probability.

6. The method of claim 4 wherein (b11) comprises:
   computing in parallel N differences between N corresponding feature elements of the first and second feature vectors;
   multiplying in parallel the N differences with N first probability coefficients to generate N products, the N first probability coefficients representing N slopes of N linear segments of the piecewise PDF's of the corresponding N feature elements of one of the first and second feature vectors, the products being saturated by N corresponding maximum probability values; and
   subtracting in parallel the N products from N corresponding second probability coefficients to generate the N individual probabilities.

7. An apparatus comprising:
   (a) first and second storages to store first and second feature vectors, the first and second feature vectors representing first and second patterns, respectively; and
   (b) a similarity estimator coupled to the first and second storages to compute a similarity probability of the first and second feature vectors using a symmetrical piecewise linear probability density function (PDF) including a plurality of linear segments, the similarity probability corresponding to a similarity measure between the first and second patterns.

8. The apparatus of claim 7 wherein the first and second feature vectors each have one or more feature elements corresponding to one or more feature dimensions in a feature space of the first and second patterns.

9. The apparatus of claim 8 wherein the similarity estimator computes a total probability by a linear combination of individual probabilities, the total probability corresponding to the similarity measure.

10. The apparatus of claim 9 wherein the similarity estimator computes individual probabilities based on the corresponding feature elements of the first and second feature vectors.

11. The apparatus of claim 10 wherein the similarity estimator comprises:
    a first subtractor coupled to the first and second storages to compute a difference between the corresponding feature elements of the first and second feature vectors;
    a probability coefficient storage to store first and second probability coefficients;
    a multiplier coupled to the first subtractor and the probability coefficient storage to multiply the difference with the first probability coefficient, the multiplier generating a product, the first probability coefficient representing a slope of a linear segment of the piecewise PDF of the corresponding feature element of one of the first and second feature vectors, the product being saturated by a corresponding maximum probability value; and
    a second subtractor coupled to the multipler and the probability coefficient storage to subtract the product from the second probability coefficient, the second subtractor generating the corresponding individual probability.

12. The apparatus of claim 10 wherein the similarity estimator comprises:
    a first subtractor array coupled to the first and second storages to compute in parallel N differences between N corresponding feature elements of the first and second feature vectors;
    a probability coefficient storage to store first and second probability coefficients;
    a multiplier array coupled to the first subtractor and the probability coefficient storage to multiply in parallel the N differences with N first probability coefficients, the multiplier array generating N products, the N first probability coefficients representing N slopes of N linear segments of the piecewise PDF's of the corresponding N feature elements of one of the first and second feature vectors, the products being saturated by N corresponding maximum probability values; and a second subtractor array coupled to the multipler array and the probability coefficient storage to subtract in parallel the N products from N corresponding second probability coefficients, the second subtractor array generating the N individual probabilities.

13. A processor comprising:

first and second storages to store first and second feature vectors, the first and second feature vectors representing first and second patterns, respectively;

a similarity estimator coupled to the first and second storages to compute a similarity probability of the first and second feature vectors using a symmetrical piecewise linear probability function (PDF) including a plurality of linear segments, the similarity probability corresponding to a similarity measure between the first and second patterns; and a classifier coupled to the similarity estimator to classify the first pattern based on the similarity measure.

14. The processor of claim 13 wherein the first and second feature vectors each have one or more feature elements corresponding to one or more feature dimensions in a feature space of the first and second patterns.

15. The processor of claim 14 wherein the similarity estimator computes a total probability by a linear combination of individual probabilities, the total probability corresponding to the similarity measure.

16. The processor of claim 15 wherein the similarity estimator computes individual probabilities based on the corresponding feature elements of the first and second feature vectors.

17. The processor of claim 16 wherein the similarity estimator comprises:

a first subtractor coupled to the first and second storages to compute a difference between the corresponding feature elements of the first and second feature vectors;

a probability coefficient storage to store first and second probability coefficients;

a multiplier coupled to the first subtractor and the probability coefficient storage to multiply the difference with the first probability coefficient, the multiplier generating a product, the first probability coefficient representing a slope of a linear segment of the piecewise PDF of the corresponding feature element of one of the first and second feature vectors, the product being saturated by a corresponding maximum probability value; and a second subtractor coupled to the multiplier and the probability coefficient storage to subtract the product from the second probability coefficient, the second subtractor generating the corresponding individual probability.

18. The processor of claim 16 wherein the similarity estimator comprises:

a first subtractor array coupled to the first and second storages to compute in parallel N differences between N corresponding feature elements of the first and second feature vectors;

a probability coefficient storage to store first and second probability coefficients;

a multiplier array coupled to the first subtractor and the probability coefficient storage to multiply in parallel the N differences with N first probability coefficients, the multiplier array generating N products, the N first probability coefficients representing N slopes of N linear segments of the piecewise PDF's of the corresponding N feature elements of one of the first and second feature vectors, the products being saturated by N corresponding maximum probability values; and a second subtractor array coupled to the multiplier array and the probability coefficient storage to subtract in parallel the N products from N corresponding second probability coefficients, the second subtractor array generating the N individual probabilities.

* * * * *